United States Patent [19]

Prince et al.

[11] Patent Number: 5,246,319
[45] Date of Patent: Sep. 21, 1993

[54] METHOD AND APPARATUS FOR CREATING TOOL PATH DATA FOR A NUMERICALLY CONTROLLED CUTTER TO CREATE INCISED CARVINGS

[76] Inventors: Lawrence R. Prince; Andre E. Prince, both of 72 Whisconier Rd., Brookfield, Conn. 06804

[21] Appl. No.: 932,265

[22] Filed: Aug. 19, 1992

[51] Int. Cl.⁵ .................. B23C 1/16; G05B 19/403
[52] U.S. Cl. .................. 409/80; 364/474.29; 364/474.32; 409/84
[58] Field of Search .......... 409/84, 80, 79, 85, 409/93; 364/474.29, 474.25, 474.32

[56] References Cited

U.S. PATENT DOCUMENTS

| | | | |
|---|---|---|---|
| 3,857,025 | 12/1974 | English et al. | 409/80 X |
| 4,095,633 | 6/1978 | Kimball et al. | 409/109 |
| 4,605,049 | 8/1986 | Giordanengo et al. | 409/105 X |
| 4,799,172 | 1/1989 | Wood et al. | 364/474.29 X |
| 4,989,152 | 1/1991 | Cheng | 364/474.29 X |
| 5,008,806 | 4/1991 | Seki et al. | 364/474.29 X |
| 5,033,005 | 7/1991 | Haske | 364/474.29 |
| 5,070,464 | 12/1991 | Seki et al. | 364/474.34 |

FOREIGN PATENT DOCUMENTS

| | | | |
|---|---|---|---|
| 191746 | 9/1985 | Japan | 409/79 |
| 55604 | 3/1989 | Japan | 364/474.29 |
| 180009 | 7/1989 | Japan | 364/474.32 |
| 8502571 | 6/1985 | World Int. Prop. O. | 409/84 |

OTHER PUBLICATIONS

Chip Carving Patterns, W. Baron, Sterling Pub. Co., pp. 1–13.
Manual of Traditional Wood Carving, P. Hasluck, Dover pp. 466–493.

*Primary Examiner*—William Briggs
*Attorney, Agent, or Firm*—Christopher A. Michaels

[57] ABSTRACT

A 2-dimensional drawing of closed shapes and/or letters is processed for incised carving with a conical tool. Each closed shape is processed independently to generate a plurality of connected cutter paths. While carving each path it is necessary to change the tool depth so that the edge of the tool at the surface of work remains tangent to two sides at all times. A recursive process is used to handle parts of the work where the cutting path splits.

11 Claims, 3 Drawing Sheets

Figure 1a
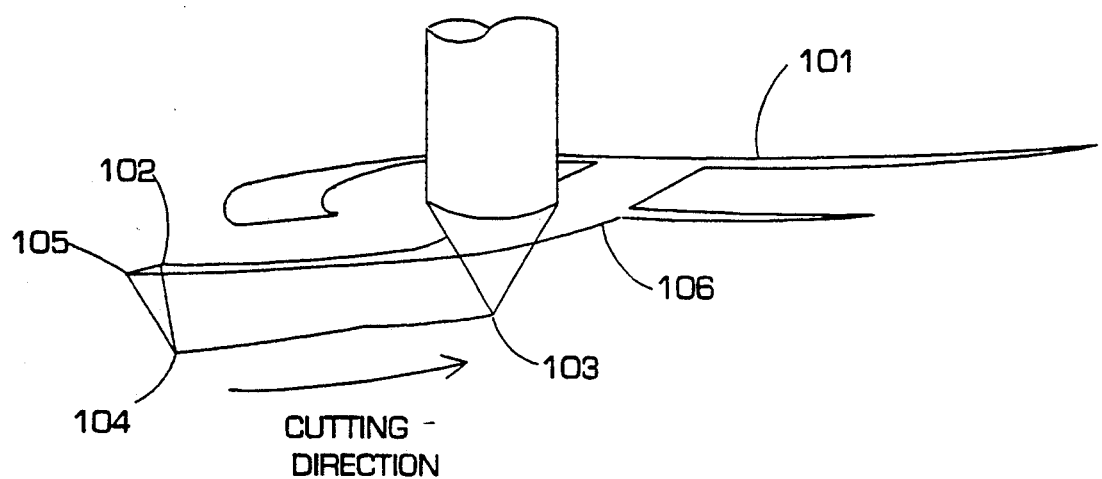
CUTTING DIRECTION
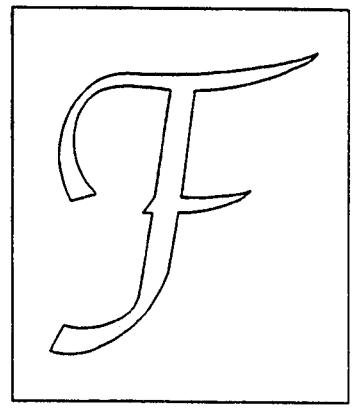
Figure 1b

Figure 2a
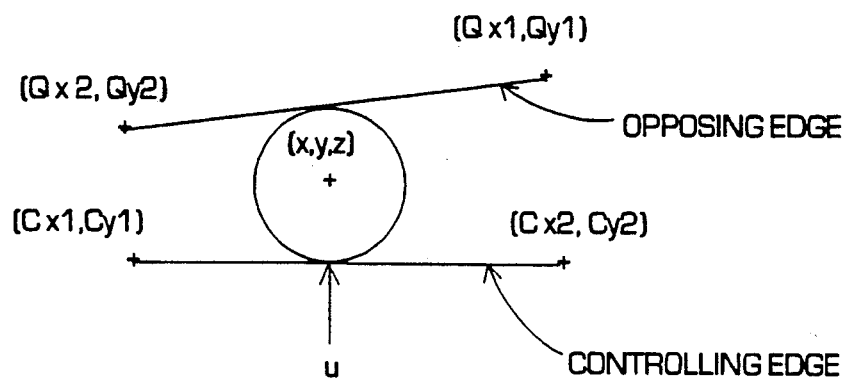
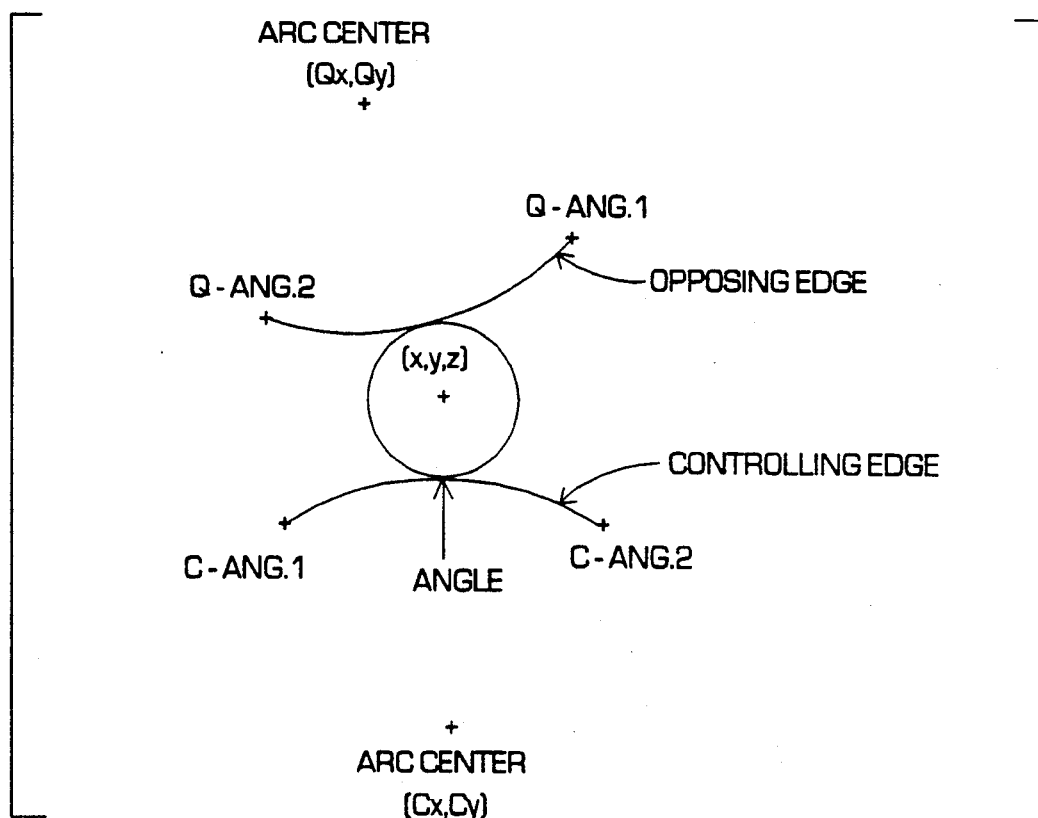
Figure 2b

METHOD AND APPARATUS FOR CREATING TOOL PATH DATA FOR A NUMERICALLY CONTROLLED CUTTER TO CREATE INCISED CARVINGS

FIELD OF THE INVENTION

The present invention relates to method and apparatus for creating data for a numerically controlled cutter, and more particularly to method and apparatus for creating data for a numerically controlled cutter from two-dimensional drawings of closed shapes.

BACKGROUND OF THE INVENTION

Currently hand tools, knives, gouges, and the like are used to produce incised (chip) carving. Alternatively, templates can be traced in two-dimensions with engravers or routers. CNC routers and carving machines use 2-dimensional tool paths or use scanning routines to produce 3-dimensional shapes. Some high-quality furniture is carved by a combination of machines and by hand. Some carving is done by routers but it is done either by hand or from a template and the quality is low. Most router carvings have rounded corners which reveal the shape of the tool used. The system of the present invention does not have to round the corners which are drawn with angles. This invention is novel because a 2-dimensional drawing is used to compute the third dimension automatically and thus define the final shape and appearance of the work piece.

There are four main categories of similar devices or processes. First there are multiple carving machines which use an original carving and copy it many times (such as U.S. Pat. No. 4,605,049). The system of the present invention requires no original to be traced. Because of this, the system of the present invention can efficiently produce a single carving.

Second are processes that produce a carved or machined shape. Some of these produce the carved shape by tracing in a raster or a boustrophedonic manner. The tool paths created by the system of the present invention are not made this way. An NC data creation method is taught in U.S. Pat. No. 5,008,806 but this uses surfaces and a ball-nose tool whereas the system of the present invention uses two-dimensional boundaries (or three-dimensional boundaries of specific shapes) and the shape of the tool. Methods such as U.S. Pat. No. 5,008,806 are only intended to rough out the shape to make the finishing process easier.

Third are signs produced with a router and a template. These require rounded corners which reveal the shape of the tool and make the work look mass-produced. The system of the present invention requires no rounded corners because the system of the present invention cleans up all corners.

Fourth are individuals who hand-carve signs and other works. We have taken what was once done by hand with flat knives and changed the process so that the results look the same but the carvings can be done by a conical tool.

SUMMARY OF THE PRESENT INVENTION

It is therefore a primary object of the present invention to provide method and apparatus for creating data for a numerically controlled cutter such that a two-dimensional drawing of closed shapes and/or letters is processed for incised carving with a specified tool.

One of the discoveries of the present invention is a method for providing NC data. The method and apparatus of the present invention provide a novel system for carving. The method of creating an incised carving includes using the method of providing tool path data for at least one closed shape and using the numerically controlled cutter to cut the carving as described above. The discoveries of the present invention have taken a craft and turned it into a technology. This innovation will change the way incised carving, engraving, carved sign making, etc. is done. The potential market is very large for products produced by this process.

Input data is provided relating to boundaries of at least one closed shape wherein the boundaries define edges of the incised carving. One of the boundaries is selected to be a controlling edge. One of the boundaries intersecting the controlling edge is selected to be an opposing edge. A cutter path for the cutter is determined that is in between the controlling edge and the opposing edge. The cutter path begins at the intersection of the controlling edge and opposing edge and ends at either a second intersection of the controlling edge and the opposing edge or an intervening edge point whichever occurs first. A tool depth is determined at each point along the cutter path such that edges of the tool remain tangent to two sides of the carving at all times. The sides are defined by the controlling and opposing edges and the edges of the tool. If one exists, a second intersection of the controlling edge and the opposing edge is determined. If any exist, intervening edge points are determined. An intervening edge point exists when the tool edge encounters a boundary of the closed shape not corresponding to the controlling edge or the opposing edge. An output of tool path data is provided for a numerically controlled cutter comprising the determined cutter path and the determined tool depth.

These and other objects, features and advantages of the present invention should become apparent from the following description when taken in conjunction with the accompanying drawings.

BRIEF DESCRIPTION OF THE DRAWINGS

FIGS. 1a and 1b are representational views of the method and apparatus of the present invention being used to create and incised carving of the two-dimensional closed shape shown in FIG. 1b.

FIGS. 2a and 2b are representational views of the cutter, the controlling edge and the opposing edge for line segments and arcs respectively to illustrate the current system for creating incised carvings.

DESCRIPTION OF THE PREFERRED EMBODIMENTS

Figure 3:
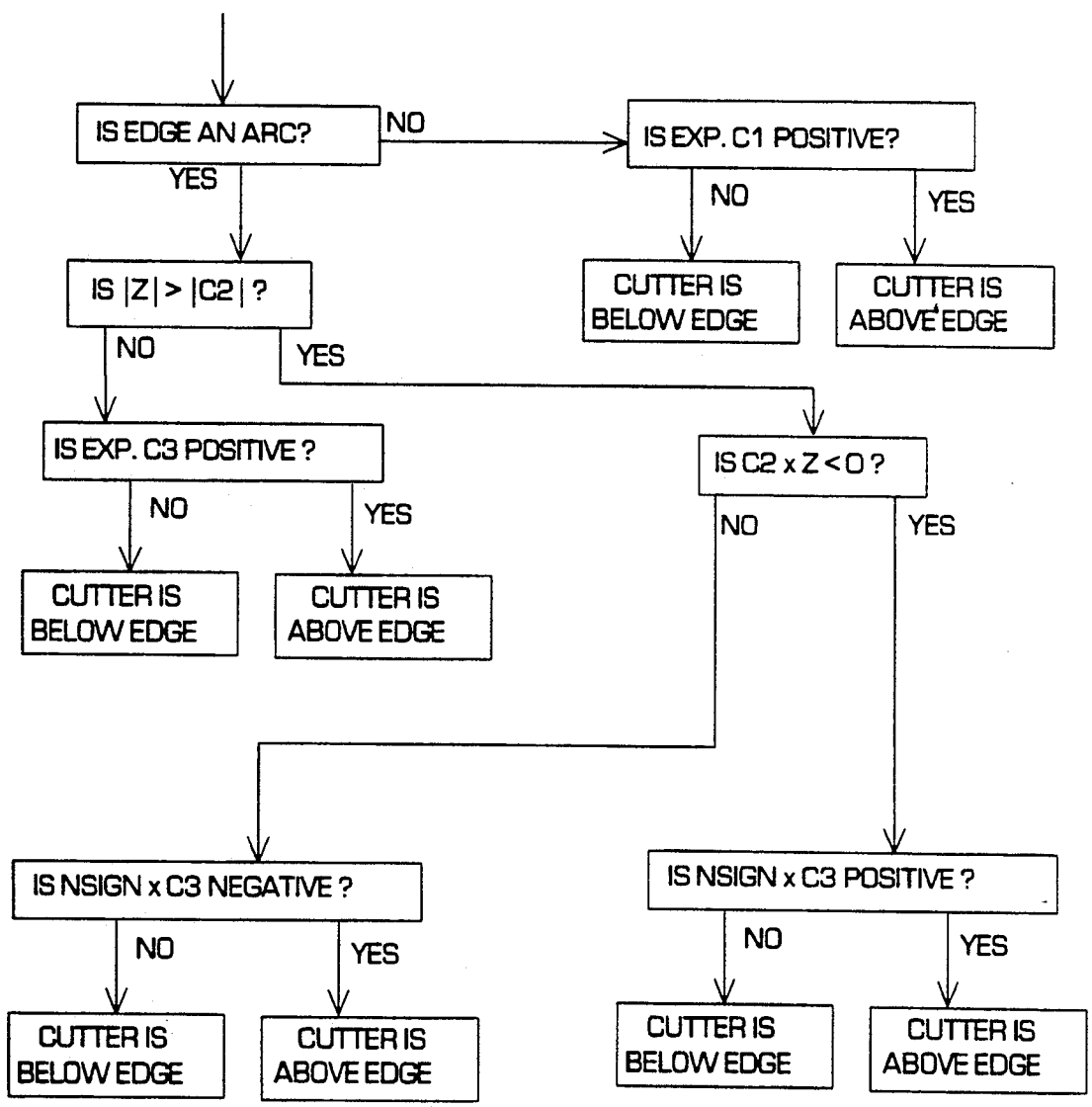
FIG. 3 is a flow chart of the sub process for determining whether the cutter is above or below a side of the carving defined by a particular edge.

For the purposes of promoting an understanding of the teachings of the present invention, references will now be made to the embodiments illustrated in the drawings and specific language will be used to describe these embodiments. It will nevertheless be understood that no limitation of the scope of the invention is thereby intended, alterations and further applications of the teachings of the present invention as illustrated and described hereinabove is anticipated by those skilled in this art.

Engraving by computer-controlled machines is currently done in two dimensions. One application for the present invention is high-detail complex engraving in three-dimensions. A conical tool with an arbitary angle is used to describe the present invention. This is a physical constant provided to the method. The sides of the carving are defined by line segments and arcs. In essence the line segments become portions of planes which have the same angle as the conical tool. Likewise, the arcs are portions of cones which have the same angle as the tool. In the development of this method, cones and planes were created from the arcs and lines and solved for their intersection. If someone were to use a different shaped tool, the equations would merely be reworked and solved for the shape of the tool. However, a conical tool has special utility in that it is able to reproduce chip carvings and the like such that it is impossible to tell whether the carving was done by hand or machine, whereas a router method usually leaves evidence of the shape of the tool.

Each closed shape is processed independently to generate a plurality of connected cutter paths. While carving each path it is necessary to change the tool depth so that the edge of the tool at the surface of the work remains tangent to two sides at all times. A recursive process is used to handle parts of the work where the cutting path splits.

The drawing to be processed consists of a plurality of closed shapes. Referring to the example of FIG. 1a and FIG. 1b, the individual shape data 101 is read into the path generating part of the program. This shape is not drawn on the part itself. FIG. 1a is only for illustration. The path generator begins with a pair of edge entities 102 which meet at a convex angle. The tool path describes the 3-dimensional position of the tip 103 of the conical tool.

The tool path begins at the previously mentioned intersection. One of the edges is chosen to be the Controlling Edge. The other is the Opposing Edge. A path is traced along the Controlling Edge by utilizing the appropriate parametric equation (depending on whether the Controlling Edge is a line segment or an arc and depending on whether the Opposing Edge is a line segment or an arc.) New points along the tool path are generated at a specified spacing. At each calculated point a test is made to check if a third edge has been encountered (bumped). This continues until the tool has either bumped a third side or until the Controlling Edge and the Opposing Edge meet at the end of the Controlling Edge. If the Controlling Edge and the Opposing Edge meet at the end of the Controlling Edge, the current path is complete (105 in FIG. 1a), although other separate paths may remain to be carved in the shape.

If at the end of the Controlling Edge, there are intervening edge elements, then carving proceeds past the end of the Controlling Edge until another Edge is bumped. In this special case, step 3 immediately below is omitted.

Within the process, whenever a third edge has been encountered (bumped), three things occur:

1. A root finder is used to determine precisely the point along the Controlling Edge where the third edge was encountered. (104 in FIG. 1a)
2. The third edge becomes the Opposing Edge. (unless the New Edge satisfies the conditions described in Test 3 in the subprocess described below.)
3. Upon completion of the current path, a separate path will be generated starting at the point where the third edge was encountered. The third edge becomes the Controlling Edge and the Opposing Edge is the original opposing edge.

Each separate path within the shape begins with code which causes a rapid move to the starting point.

Input data is provided relating to boundaries of at least one closed shape wherein the boundaries define edges of the incised carving. One of the boundaries is selected to be a controlling edge. An adjacent boundary intersecting the controlling edge is selected to be an opposing edge. A cutter path for the cutter is determined that is in between the controlling edge and the opposing edge. The cutter path begins at the intersection of the controlling edge and opposing edge and ends at either a second intersection of the controlling edge and the opposing edge or an intervening edge point whichever occurs first. A tool depth is determined at each point along the cutter path such that edges of the tool remain tangent to two sides of the carving at all times. The sides are defined by the controlling and opposing edges and the edges of the tool. If one exists, a second intersection of the controlling edge and the opposing edge is determined. If any exist, intervening edge points are determined. An intervening edge point exists when the tool edge encounters a boundary of the closed shape which lies along the boundary path from the end of the controlling edge to the start of the opposing edge. An output of tool path data is provided for a numerically controlled cutter comprising the determined cutter path and the determined tool depth.

When an intervening edge point is encountered, the opposing edge is redefined as the encountered boundary. The determinations are made as described above wherein the cutter path begins at the intervening edge point. An output of tool path data is provided for a numerically controlled cutter comprising the determined cutter path and the determined tool depth. The opposing edge is redefined as the opposing edge prior to the intervening edge point. The controlling edge is redefined as the encountered boundary. The determinations described above are made wherein the cutter path begins at the intervening edge point. An output of tool path data is provided for a numerically controlled cutter comprising the determined cutter path and the determined tool depth. A detailed carving may include many different closed shapes. Furthermore, it is often advantageous to use multiple closed shapes to carve a shape with uncarved areas within it. A carved letter "P" is an example of such a shape. The line of the "P" would be one shape and the loop of the "P" would be the second shape.

The base components for the apparatus for creating tool path data and provided the tool path data to a numerically controlled cutter to create an incised carving can generally be bought off the shelf. Means for receiving input data on boundaries of at least one closed shape wherein the boundaries define edges of the incised carving can be an input device or means for generating these shapes such as CAD program or otherwise. Furthermore, known devices exist for generating electronic data representing a shape from a drawing of that shape such as scanners and so forth. Drawings of desired carvings are much easier to make than the actual carvings. This is the major advantage of the present system. Furthermore, changes in the drawings can be made in a keystroke or the flash of pen, but changing a physical carving means starting from scratch. As improvements develop in the field of CAD programming develop they can be used to provide input data of shapes to the present system which then converts the data to NC data.

The processing unit for making determinations based upon the received input data can be most off the shelf computers with standard processors and coprocessors. The interface unit provides tool path data determined by the processing unit to the numerical controlled cutter. Interface cards are available for the NC cutters. The present invention lies in the control logic that controls the determinations made by the processing unit. The control logic performs the following functions:

1) selecting one of the boundaries to be a controlling edge;
2) selecting one of the boundaries intersecting the controlling edge to be an opposing edge;
3) determining a cutter path for the cutter that is in between the controlling edge and the opposing edge, wherein the cutter path begins at the intersection of the controlling edge and opposing edge and ends at either a second intersection of the controlling edge and the opposing edge or an intervening edge point whichever occurs first;
4) determining a tool depth at each point along the cutter path such that edges of the tool remain tangent to two sides of the carving at all times, wherein the sides are defined by the controlling and opposing edges and the edges of the tool;
5) determining the second intersection of the controlling edge and the opposing edge if one exists;
6) determining the intervening edge point if one exists wherein an intervening edge point exists when the tool edge encounters a boundary of the closed shape not corresponding to the controlling edge or the opposing edge; and
7) providing an output through the interface unit of tool path data for a numerically controlled cutter comprising the determined cutter path and the determined tool depth.

The incised carving will be made in a piece of material placed in operative association with the numerically controlled cutter. The tool depth data can be adjusted for an actual distance between a surface of the material to be carved and the tool such that the boundaries of the closed shape correspond to edges of the incised carving on the surface of the material. Furthermore, the method of the present invention can used for curved surface materials as well. In that circumstance, the two dimensional closed shape would correspond to the surface of the material which would be curved so in one respect it would be three-dimensional, however, the tool depth data would still be missing. The present system can be used to provide tool depth data with respect to the boundaries of the closed shape on the surface of the material. The present invention can be used for incised (chip) carving in a variety of materials. For example: wood, rigid architectural foams, metals, stone, glass, plastics, etc.

The method and apparatus of the present invention provide a novel method for carving. The method of creating an incised carving includes using the method of providing tool path data for at least one closed shape and using the numerically controlled cutter to cut the carving as described above. The discoveries of the present invention have taken a craft and turned it into a technology. This innovation will change the way incised carving, engraving, carved sign making, etc. is done. The potential market is very large for products produced by this process.

The following equations refer to the arcs and lines as drawn in FIg. 2a and 2b. For clarity, the Opposing Side is indicated with the letter Q. The constant $\theta_K$ refers to the angle spanned by the cutter. Each arc has an associated sign, either $C_{sign}$ or $Q_{sign}$ indicating the direction of the arc, from Ang1 to Ang2 and each arc also has a radius, either $C_{Radius}$ or $Q_{Radius}$. For example, in the FIG. 2b, both $C_{Sign}$ and $Q_{Sign}$ are negative.

$$\Delta C_x = C_{x2} - C_{x1}$$
$$\Delta C_y = C_{y2} - C_{y1}$$
$$\Delta Q_x = Q_{x2} - Q_{x1}$$
$$\Delta Q_y = Q_{y2} - Q_{y1}$$

$$|C| = \sqrt{(C_{x2} - C_{x1})^2 + (C_{y2} - C_{y1})^2}$$

$$|Q| = \sqrt{(Q_{x2} - Q_{x1})^2 + (Q - y2 - Q_{y1})^2}$$

If the Controlling Edge is a line segment, the parameter used is U. U represents the fraction along the line where the next tool position will be placed. It is 0 at $C_{x1}$, $C_{y1}$ and 1 at $C_{x2}$, $C_{y2}$. At the beginning of the first cut, U is set to 0. If the Opposing Edge is a line segment, a parameter t is given by $$t = \frac{\Delta Q_y(C_{x1} - Q_{x1} + U\Delta C_x) + \Delta Q_x(Q_{y1} - C_{y1} - U\Delta C_y)}{\frac{\Delta Q_y \Delta C_y + \Delta Q_x \Delta C_x}{|C|} - |Q|}$$

If the Opposing Edge is an arc, the parameter t is given by $$t = \frac{(C_{x1} - Q_x + U\Delta C_x)^2 + (C_{y1} - Q_y + U\Delta C_y)^2 - Q_{Radius}^2}{2\left[\frac{(C_{x1} - Q_x)\Delta C_y - (C_{y1} - Q_y)\Delta C_x}{|C|} - Q_{Sign}Q_{Radius}\right]}$$

For the above two cases, the location of the tool tip is given by $$x = C_{x1} + U\Delta C_x - \left(\frac{t\Delta C_y}{|C|}\right)$$

$$y = C_{y1} + U\Delta C_y + \left(\frac{t\Delta C_x}{|C|}\right)$$

$$z = -t \tan(\theta_K/2).$$

If the Controlling Edge is an arc, the parameter used is Angle. If the Opposing Edge is a line segment, the parameter t is given by $$t = \frac{\Delta Q_x(Q_{y1} - C_y) - \Delta Q_y(Q_{x1} - C_x) + C_{Sign}|Q|C_{Radius}}{\Delta Q_x \sin Angle - \Delta Q_y \cos Angle + C_{Sign}|Q|}$$

If the Opposing Edge is another arc, the parameter t is given by $$t = \frac{(C_x - Q_x)^2 + (C_y - Q_y)^2 - (C_{Sign}C_{Radius} - Q_{Sign}Q_{Radius})^2}{2[C_{Sign}(C_{Sign}C_{Radius} - Q_{Sign}Q_{Radius}) - (C_x - Q_x)\cos Angle - (C_y - Q_y)\sin Angle]}$$

For the above two cases, the location of the tool tip is given by $$x = C_x + t \cos Angle$$
$$y = C_y + t \sin Angle$$
$$z = -\frac{C_{Sign}C_{Radius}}{\tan(\theta_K/2)} + C_{Sign} \, t \tan(\theta_K/2).$$

The preferred embodiments of the method for generating each successive point along the cutter path, the method used to detect when the process has bumped a third Edge and the actions which are then performed are described in detail.

The process accepts a Step Size parameter. When the Controlling Edge is an arc, the parameter Angle is changed to $$Angle \leftarrow Angle + \Delta Angle$$

according to $$\Delta Angle = \frac{\partial Angle}{\partial t} \sqrt{(\partial t/\partial x)^2 + (\partial t/\partial y)^2 + (\partial t/\partial z)^2} \quad \text{(Stepsize)}$$

When the Controlling Edge is a line segment, the parameter U is changed to $$U \leftarrow U + \Delta U$$

according to $$\Delta U = \frac{\partial U}{\partial t} \sqrt{(\partial t/\partial x)^2 + (\partial t/\partial y)^2 + (\partial t/\partial z)^2} \quad \text{(Stepsize)}$$

The subprocess described here detects when in the process a third Edge is encountered, (bumped). At the start of the process, a table is created with entries for each Edge between the Controlling Edge and the Opposing Edge. The entry for each Edge tells whether the cutter, at the start of the move, is above or below the surface determined by that Edge. If the Edge is an arc, the surface that will be carved is in the shape of a cone and if the Edge is a line segment, the surface that will be carved is in the shape of a plane. The above/below determination is made by another subprocess described in detail below.

At each point along the carving, all of the intervening Edges are tested to see if the cutter would be above or below the surface. If there is no CHANGE in the state for any Edge, cutting proceeds normally. If there is a CHANGE in the state then we potentially have a bumped Edge. This third Edge will be called the New Edge for the remainder of this discussion. Several tests are made in order to determine if the New Edge was, in fact, bumped. If these tests fail, the entry for the New Edge in the previously mentioned table is changed to the current state, either above or below, and cutting proceeds as though no Edge were bumped. If any of these tests succeed, the New Edge is a bumped Edge. In order to determine where the bump occurred, the position along the path from the previous cutter position to the current cutter position at which $t_1-t_2=0$ is determined (calculated to sufficient accuracy). $t_1$ is the value t described above. $t_2$ is the value t but with the New Edge substituted for the Opposing Edge. Any of several root-finders can be used (See, for example, the Secant Algorithm described in Burden, Richard L. et. al., *Numerical Analysis*, 4th ed. PWS-KENT Publishing Co., pp. 31-59, incorporated herein by reference). The process then proceeds as described above.

Test 1. A test is made to see if the cutter lies along the New Edge. If the New Edge is an arc, then the angle from the arc center to the point of the cutter is tested to see if it lies within the arc. If the cutter point does not lie within the arc, a check is made to determine which angle, the starting angle or the ending angle of the arc, is closer to the cutter point angle. If the starting angle is closer, it is assumed that the cutter point lies before the start of the New Edge. If the ending angle is closer, it is assumed that the cutter point lies after the end of the New Edge. If the New Edge is a line segment, then a test is made to see if the line perpendicular to the point of the cutter intersects the line segment. If this perpendicular line does not intersect the line segment, a check is made to determine if the cutter point lies before the start of the New Edge or after the end of the New Edge. If the cutter point lies along the New Edge, this test succeeds and the New Edge is a bumped Edge. Otherwise the process proceeds to Test 2.

Test 2. The angle at which the New Edge join one of its neighbors is checked. (The neighbor before the New Edge if the cutter point lies before the New Edge or the neighbor after the New Edge if the cutter point lies after the New Edge) If this angle is positive (meaning the New Edge and the neighboring Edge join at a convex angle) then the New Edge is not a bumped Edge. If this angle is negative (meaning the New Edge and the neighboring Edge join at a concave angle) then the process proceeds to Test 3.

Test 3. If this neighboring Edge is neither the Controlling Edge nor the Opposing Edge, proceed to Test 4. If the neighboring Edge IS either the Controlling Edge or the Opposing Edge then check if the cutter is now above the New Edge. If it is above the New Edge, then the New Edge is a bumped Edge. In this special case, the algorithm does not split as it usually does. Instead, the New Edge substitutes for the Controlling or Opposing Edge. If the cutter is NOT above the New Edge, then the New Edge is not a bumped Edge.

Test 4. If the cutter is below the neighboring Edge, then the New Edge is a bumped Edge. In all other cases, the New Edge is not a bumped Edge.

As described previously, there is a subprocess to determine if the cutter is above or below each Edge. FIG. 3 outlines this subprocess.

In the following expressions, the cutter tip position is x,y,z, the angle spanned by the cutter is $\theta_K$. FIG. 2 shows line segments and arcs. The New Edge will be denoted by the letter N but will otherwise have the same constants describing it as the Opposing Edge and the Controlling Edge in that figure.

$$x(N_{y1} - N_{y2}) + y(N_{x2} - N_{x1}) + \quad \text{(C.1)}$$

$$z \frac{\sqrt{(N_{y2} - N_{y1})^2 + N_{x2} - N_{x1}^2}}{\tan(\theta_K/2)} +$$

$$N_{y1}(N_{x1} - N_{x2}) + N_{x1}(N_{y2} - N_{y1})$$

$$-N_{Sign}N_{Radius}\tan(\theta_K/2) \quad \text{(C.2)}$$

$$N_{Sign}\bigg\{ (N_x - x)^2 + (N_y - y)^2 - \quad \text{(C.3)}$$

$$\left[ N_{Sign}N_{Radius} + \frac{z}{\tan(\theta_K/2)} \right]^2 \Big\}$$

The process consists of following the steps in FIG. 3 to determine if the cutter is above or below the proposed New Edge. If the Edge is a line segment and C.1 is positive then the cutter is above the Edge. If the Edge is a line segment and C.1 is negative then the cutter is below the Edge. If the Edge is an arc, the cutter is above the edge if: 1) the absolute value of z is not greater than the absolute value of C.2 and Exp. C.3 is positive; 2) the absolute value of z is greater than the absolute value of C.2, the product of z and C.2 is less than 0 and the product of $N_{sign}$ and C.3 is positive; or 3) the absolute value of z is greater than the absolute value of C.2, the product of z and C.2 is not less than 0 and the product of $N_{sign}$ and C.3 is negative. If the Edge is an arc, the cutter is below the edge if: 1) the absolute value of z is not greater than the absolute value of C.2 and Exp. C.3 is not positive; 2) the absolute value of z is greater than the absolute value of C.2, the product of z and C.2 is less than 0 and the product of $N_{sign}$ and C.3 is not positive; or 3) the absolute value of z is greater than the absolute value of C.2, the product of z and C.2 is not less than 0 and the product of $N_{sign}$ and C.3 is not negative.

The foregoing description has been directed to particular embodiments of the invention in accordance with the requirements of the Patent Statutes for the purposes of illustration and explanation. It will be apparent, however, to those skilled in this art that many modifications and changes will be possible without departure from the scope and spirit of the invention. It is intended that the following claims be interpreted to embrace all such modifications.

I claim:

1. A method of creating tool path data for a numerically controlled cutter to create an incised carving, comprising the steps of:
    a) providing input data on boundaries of at least one closed shape wherein said boundaries define edges of said incised carving;
    b) selecting one of said boundaries to be a controlling edge;
    c) selecting one of said boundaries intersecting said controlling edge to be an opposing edge;
    d) determining a cutter path for said cutter that is in between said controlling edge and said opposing edge, wherein said cutter path begins at said intersection of said controlling edge and opposing edge and ends at either a second intersection of said controlling edge and said opposing edge or an intervening edge point whichever occurs first;
    e) determining a tool depth at each point along said cutter path such that edges of said tool remain tangent to two sides of said carving at all times, wherein said sides are defined by said controlling and opposing edges and said edges of said tool;
    f) determining said second intersection of said controlling edge and said opposing edge if one exists;
    g) determining said intervening edge point if one exists wherein an intervening edge point exists when said tool edge encounters a boundary of said closed shape not corresponding to said controlling edge or said opposing edge; and
    h) providing an output of tool path data for a numerically controlled cutter comprising said determined cutter path and said determined tool depth.

2. The method of claim 1 further comprising steps for providing tool path data beginning at an intervening edge point, wherein said steps include:
    i) redefining said opposing edge as said encountered boundary,
    j) making the determinations of steps d) through g) wherein said cutter path begins at said intervening edge point; and
    k) providing an output of tool path data for a numerically controlled cutter comprising said determined cutter path and said determined tool depth.

3. The method of claim 2 further comprising the following steps:
    l) redefining said opposing edge as said opposing edge prior to said intervening edge point;
    m) redefining said controlling edge as said encountered boundary;
    n) making the determinations of steps d) through g) wherein said cutter path begins at said intervening edge point; and
    o) providing an output of tool path data for a numerically controlled cutter comprising said determined cutter path and said determined tool depth.

4. The method of claim 3 further comprising continuing steps b) through o) for each of said boundaries of said closed shape such that said incised carving can be created by said numerically controlled cutter provided with said tool depth data.

5. The method of claim 1 wherein said tool is conical.

6. The method of claim 1 wherein said incised carving is to be made in a piece of material placed in operative association with said numerically controlled cutter and said method further comprises adjusting said tool depth data for an actual distance between a surface of said material to be carved and said tool such that said boundaries of said closed shape correspond to edges of said incised carving on said surface of said material.

7. The method of claim 6 wherein said surface is curved.

8. A method of creating an incised carving comprising using the method of claim 4 to provide tool path data for at least one closed shape and using said numerically controlled cutter to cut said carving.

9. Apparatus for creating tool path data and provided said tool path data to a numerically controlled cutter to create an incised carving, comprising the steps of:
    a) means for receiving input data on boundaries of at least one closed shape wherein said boundaries define edges of said incised carving;
    b) a processing unit for making determinations based upon said received input data;
    c) control logic for said processing unit for selecting one of said boundaries to be a controlling edge;
    d) control logic for said processing unit for selecting one of said boundaries intersecting said controlling edge to be an opposing edge;
    e) control logic for said processing unit for determining a cutter path for said cutter that is in between said controlling edge and said opposing edge, wherein said cutter path begins at said intersection of said controlling edge and opposing edge and ends at either a second intersection of said controlling edge and said opposing edge or an intervening edge point whichever occurs first;

f) control logic for said processing unit for determining a tool depth at each point along said cutter path such that edges of said tool remain tangent to two sides of said carving at all times, wherein said sides are defined by said controlling and opposing edges and said edges of said tool;

g) control logic for said processing unit for determining said second intersection of said controlling edge and said opposing edge if one exists;

h) control logic for said processing unit for determining said intervening edge point if one exists wherein an intervening edge point exists when said tool edge encounters a boundary of said closed shape not corresponding to said controlling edge or said opposing edge;

i) an interface unit for providing tool path data to said numerical controlled cutter; and j) control logic for said processing unit for providing an output through said interface unit of tool path data for a numerically controlled cutter comprising said determined cutter path and said determined tool depth.

10. The apparatus of claim 9 wherein said incised carving is to be made in a piece of material placed in operative association with said numerically controlled cutter and said apparatus further comprises control logic for adjusting said tool depth data for an actual distance between a surface of said material to be carved and said tool such that said boundaries of said closed shape correspond to edges of said incised carving on said surface of said material.

11. The apparatus of claim 10 wherein said surface is curved.

* * * * *